United States Patent [19]

Camarata

[11] Patent Number: 4,985,892
[45] Date of Patent: Jan. 15, 1991

[54] BASEBAND LOCAL AREA NETWORK USING ORDINARY TELEPHONE WIRING

[75] Inventor: Joseph M. Camarata, Palos Verdes Peninsula, Calif.

[73] Assignee: Xerox Corporation, Stamford, Conn.

[21] Appl. No.: 616,348

[22] Filed: Jun. 1, 1984

[51] Int. Cl.$^5$ .............................................. H04J 1/02
[52] U.S. Cl. ...................................... 370/123; 370/124
[58] Field of Search ...................... 370/85, 76, 94, 123, 370/124; 179/18 AD

[56] References Cited

U.S. PATENT DOCUMENTS

| | | | |
|---|---|---|---|
| 3,522,381 | 7/1970 | Feder | 370/85 |
| 3,577,202 | 4/1971 | Brightman | 370/85 |
| 4,069,392 | 1/1978 | Goldberg et al. | 178/3 |
| 4,291,199 | 9/1981 | Densmore et al. | 179/18 AD |
| 4,417,335 | 11/1983 | Kelly et al. | 179/18 AD |
| 4,443,662 | 4/1984 | Nakhla | 333/32 |
| 4,456,986 | 6/1984 | Carsten et al. | 370/30 |
| 4,488,004 | 12/1984 | Bogart et al. | 179/18 AD |
| 4,536,615 | 8/1985 | Kimijima et al. | 179/18 AD |
| 4,546,212 | 10/1985 | Crowder | 370/76 |
| 4,672,605 | 1/1987 | Hustig et al. | 370/76 |
| 4,785,448 | 11/1988 | Reichert et al. | 370/123 |

FOREIGN PATENT DOCUMENTS 55-23668 2/1980 Japan .

OTHER PUBLICATIONS

"High-Frequency Data Transmission Over Urban Telephone Networks" by G. P. Divnogortsev, *Data Transmission*, pp. 40-42.
*Telecommun. & Radio Eng.* Pt. 1 (U.S.A.) vol. 26, No. 6 (Jun. 1972).
"LAN" in Network, Jul.-Aug. 1983, pp. 6-14.
Brochure Entitled "Linemate 192", *Coherent Communications Corp.* (No. Date).
Article from the Conference on International Switching Symposium by Tsuda et al., May 7-10, 1979.
*Rolm Corporation Article* Entitled "Integrating Voice and Data Communications with the Rolm CBX", (No Date), pp. 1-5.
"Comparing Features Aids Selecting Broadband Local Net" by Gibson in *Data Communications*, Apr. 1982, pp. 127, 132.
"Which Local Net Bus Access is Most Sensitive to Traffic Cong." by Stuck in *Data Communications*, Jan. 1983, pp. 107-120.
"A Primer for Evaluating and Purchasing Today's Local Networks" by Gibson in *Data Communications*, Jun. 1982, pp. 147-156.

*Primary Examiner*—Douglas W. Olms
*Assistant Examiner*—Melvin Marcelo
*Attorney, Agent, or Firm*—Robert E. Cunha

[57] ABSTRACT

A Local Area Network (LAN) is disclosed which enables a generalized data communication facility to be established over ordinary telephone wiring. The disclosed technique provides a completely general LAN architecture with any access protocol and is well suited to CSMA/CD (carrier sense, multiple access with collision detection). The invention consists of architectural and circuit techniques which enable the construction of a local area network(s) (LAN) over ordinary wiring within a building or between buildings within a short distance of each other (often called a campus). The LAN is implemented without disturbing the normal voice function of the telephone circuits and without the need to string addirional wiring. Implementing a LAN in accordance with this invention only requires three types of hardware functional elements (in the appropriate quantities for the application): (a) a Node Unit (NU), (b) Repeater Unit (RU), and (c) depending on the size of the network, possibly a Pulse Regenerator Unit (PRU).

15 Claims, 17 Drawing Sheets

FOUR WIRE DATA ONLY (DO) LAN

TWO WIRE DATA ONLY (DO) LAN

RU SIMPLEX BUS PSEUDO EXPANSION FOR LARGE NETWORKS

HALF DUPLEX LINE CIRCUIT CONFIGURATION

FUNCTIONAL BLOCK DIAGRAM OF ONE
RECEIVER/DRIVER CIRCUIT

TO & FROM FIG. 7B

RU - SIMPLEX / SIMPLEX

RU - SIMPLEX / HALF-DUPLEX

FIG. 10 RU — HALF-DUPLEX / SIMPLEX

PSEUDO BUS NODE

FIG. 11 — RU - HALF-DUPLEX / HALF-DUPLEX

HALF-DUPLEX/SIMPLEX BIDIRECTIONAL DRIVER

EXAMPLE OF LOW COST LAN WITH CLUSTER CONTROLLER

LOW COST LAN ARCHITECTURE WITH MULTIFORT ROUTER AND GENERAL
SERVER NODE WITH GATEWAY TO HIGH PERFORMANCE NETWORK

HALF-DUPLEX/HALF DUPLEX BIDIRECTIONAL DRIVER

*ONLY REQUIRED IF WIRES ARE USED FOR A VOICE CIRCUIT

PULSE REGENERATOR UNIT (PRU) FOR A HALF-DUPLEX
RU PSEUDO BUS NODE EXPANSION

BASEBAND LOCAL AREA NETWORK USING ORDINARY TELEPHONE WIRING

This invention discloses a low cost Local Area Network (LAN) concept, and associated techniques, which enable a generalized data communication facility to be established over ordinary telephone wiring. Different variants are disclosed which enable the technique to be widely applicable and able to accommodate differences in telephone installations. Several of the variants superimpose data communication over existing voice circuits in a non-interfering and independent manner relative to normal voice communication. With these latter approaches, the same wires can be used simultaneously for both voice and data communications.

BACKGROUND OF THE INVENTION

The Local Area Network (LAN) is the heart of the office automation movement. There are many different approaches being marketed and all the ones with acceptable performance attributes for a LAN require installation of the transmission medium (whether it be coaxial cable, twisted pair or fiber optic cables). In a generalized application environment (regardless of the transmission medium selected) the installation of the transmission medium is both costly and inconvenient. Thus the concept of using in-place wiring to construct a LAN has much appeal. This basically defines two possibilities, (a) electrical power wiring and, (b) telephone wiring. Due to a number of practical problems, electrical power wiring is quickly eliminated as not interesting for a generalized LAN environment. Telephone wiring, on the other hand, is an excellent candidate. It is an ubiquitous resource that exists at any conceivable location for a workstation. It is also a highly under-utilized resource, both in terms of wires that are not used and, for those that are used, in terms of the bandwidth that is utilized.

For many years, the standard way of using telephone wiring for data communications was, and continues to be, via carrier modulation-demodulation techniques using modems. More recent techniques use short haul modems with carriers well above the voice frequency range and allow simultaneous voice and data communications on the same lines. The main problems with these techniques for LAN type applications are that they: (a) have very limited bandwidth, (b) require relatively expensive electronics, and (c) are fundamentally point-to-point methods as opposed to possessing the general interconnectability attribute desired for LANs. The disclosed technique, on the other hand, will enable a completely general LAN architecture with any access protocol and, in particular, is well suited to CSMA/CD (carrier sense, multiple access with collision detection). As a digital baseband system, it provides much greater bandwidth and, at the same time, costs much less than modem techniques. Because it is a baseband system, the allowable length of the communication links for the disclosed system will be more restricted than with modulated carriers, but will be quite adequate for virtually any foreseeable installation. For example, at 300 KHz, there should be no electrical problem to using links whose length is well over 1000 feet (305 meters). Relative to allowable error rates, the intelligence of the distributed resources in LAN applications allows for very error resistent communication protocols to be utilized. Consequently, extremely low error rates are not required.

DESCRIPTION OF THE DRAWINGS

For a more complete understanding of the invention, reference may be had to the following detailed description of the invention in conjunction with the drawings wherein.

GENERAL DESCRIPTION OF THE INVENTION

Figure 1:
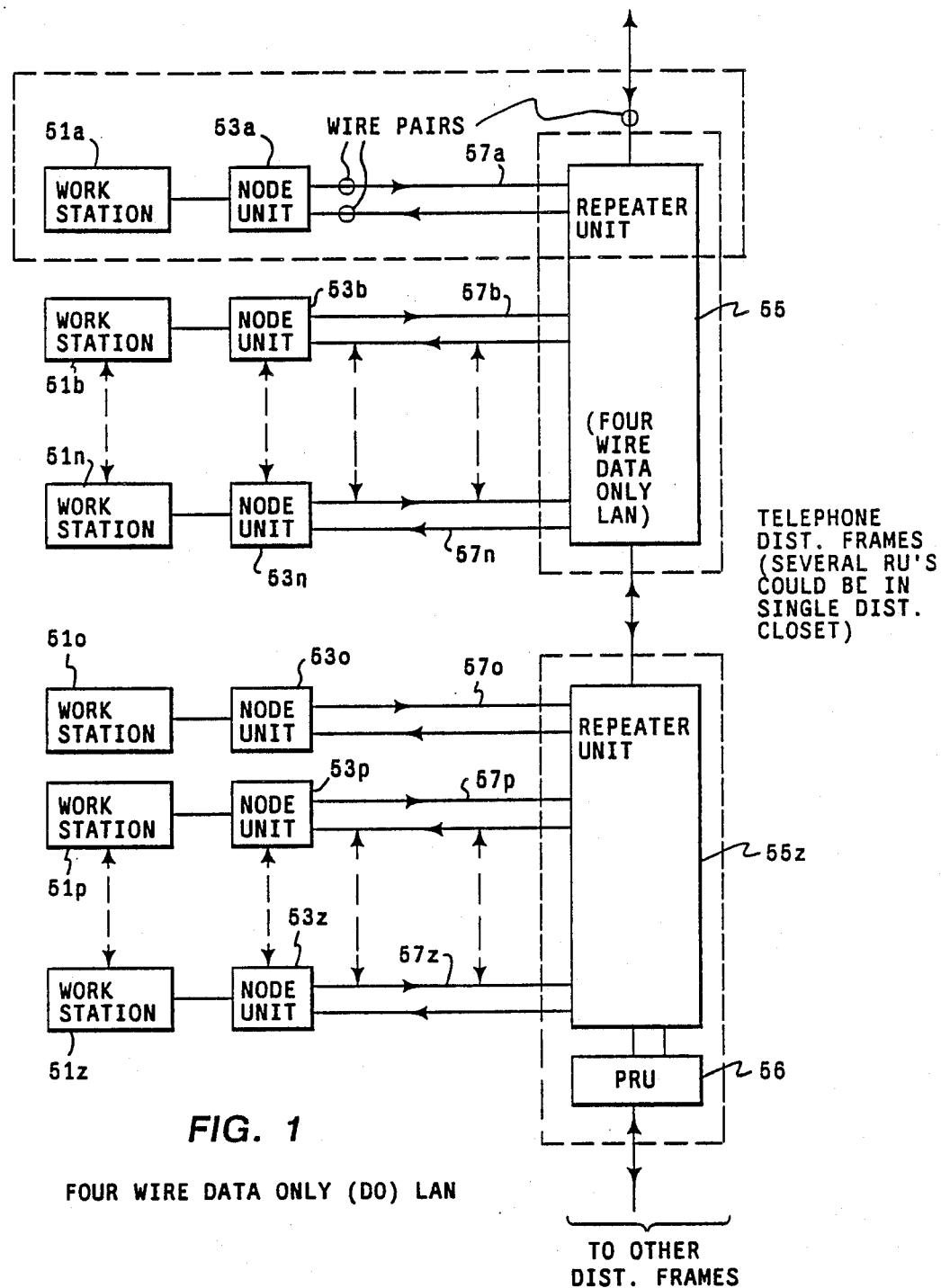
FIG. 1 is a block diagram of a four wire data only (DO) local area network (LAN) in accordance with the principles of the present invention.

U.S. Pat. No. 4,063,220 (Dec. 13, 1977), *Multipoint Data Communication System With Collision Detection*, describes the well-known Local Area Network system identified as ETHERNET. The abstract of this patent discloses "apparatus for enabling communications between two or more data processing stations comprising a communication cable arranged on branched segments including taps distributed thereover. Tied to each tap is a transceiver which on the other side connects to an associated interface stage. Each transceiver includes, in addition, the usual transmitter and receiver sections, a gate which compares the data from the interface stage with the data on the cable and indicates whether such are equal. Should such be unequal, an interference between the transceiver and the cable is indicated, disabling the associated transmitter section."

While the Ethernet system protocol is rapidly becoming an industry standard, it requires a high bandwidth communication cable for the data transmission. Installing this cable in a new office or other type structure is not difficult, but it becomes very expensive when installation is to take place in an existing building. Utilizing the structure's existing telephone wires for non-circuit switched connections on a distributed communication network becomes an attractive solution not solved previously.

Topologically all telephone networks are a star configuration with a centralized switching/processing function at the hub. Large wire bundles radiate out to telephone closets in the building where the connections to individual phone instruments are made. Thus, from each instrument, there is a twisted pair (usually 2 twisted pairs) which goes to the telephone closet from where it is connected to wires running to the PBX.

This invention consists of architectural and circuit techniques which enable the construction of a local area network(s) (LAN) over ordinary telephone wiring within a building or between buildings within a short distance of each other (often called a campus). Furthermore, the LAN is implemented without disturbing the normal voice function of the telephone circuits and without the need to string additional wiring.

Some features of this invention are:
uses low cost baseband signalling techniques;
has true LAN connectivity, i.e. logical virtual connections vs. switched circuit connections; functionally, users appear to be connected to a bus;
allows any access protocol, i.e., CSMA, CSMA/CD, token passing, etc.;
has four variants defined;
uses existing telephone wiring thus making it unnecessary to string wiring (cabling) to establish a LAN facility;
is capable of providing a very useful communication bandwidth (typically in the range of 300K to 500 KHz).

The four basic implementation variants for this invention are combinations of four-wire or two-wire schemes for data-over-voice (DOV) or data-only (DO) techniques.

Implementing a LAN in accordance with this invention only requires three types of hardware functional elements (in the appropriate quantities for the application): (a) a Node Unit (NU), (b) Repeater Unit (RU), and (c) depending on the size of the network, possibly a Pulse Regenerator Unit (PRU). In this general description, they will only be discussed at the block diagram functional level along with some physical implementation details. The detailed description below will get into the inner details of these functions.

Typically, buildings have "telephone closets" strategically located throughout the building. They are needed to interconnect and service telephone circuits within localized areas of the building. They also have wires which enable interconnection between the closets.

Figure 2:
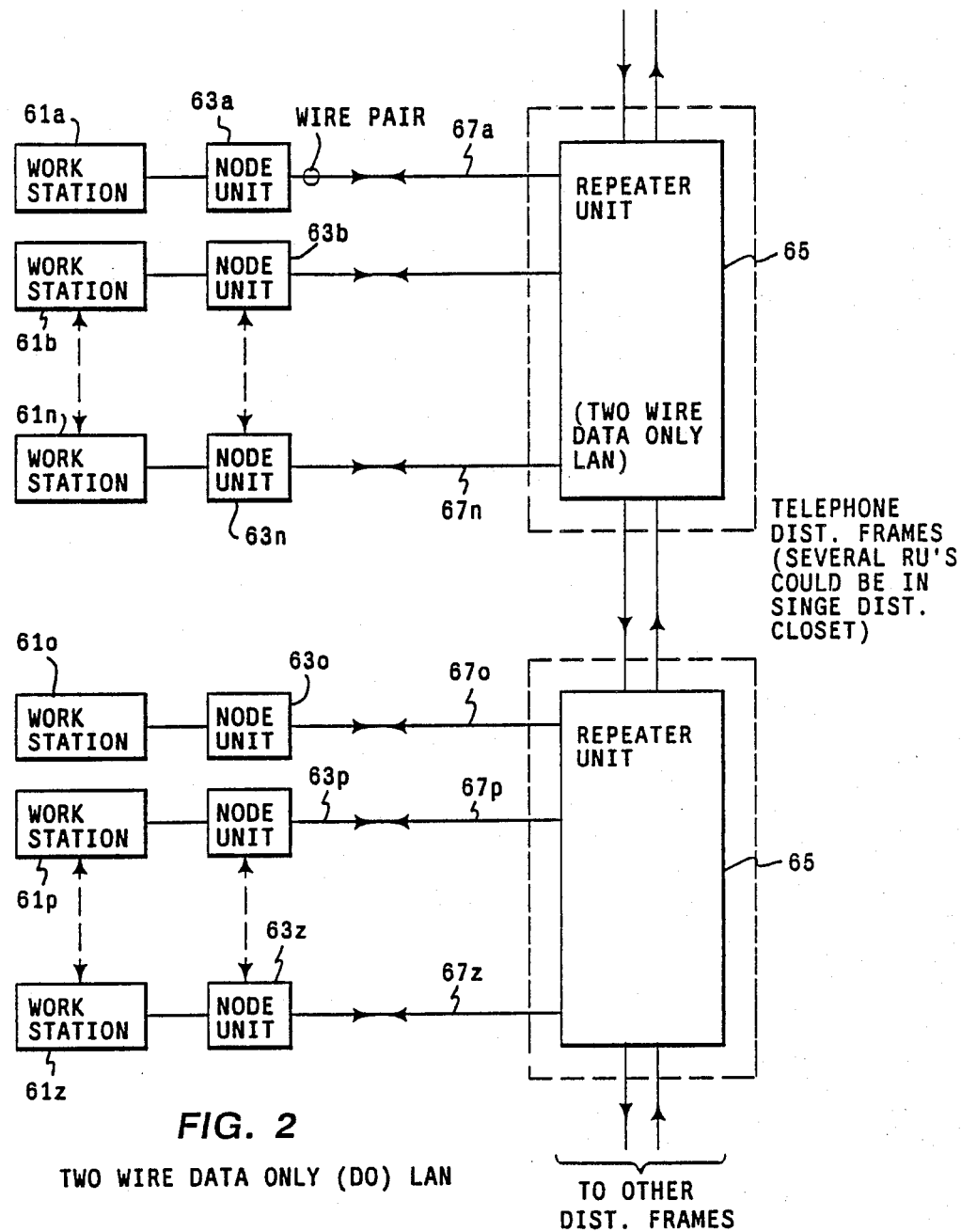
FIG. 2 is a block diagram for a two wire data only (DO) local area network (LAN)

An overall system view of the role of these functions and the general architecture of this LAN technique is seen in FIGS. 1 and 2 for the data-only (DO) configuration. At this level of block diagram detail, the only difference for the data-over-voice implementation is that phone instruments would be shown connecting to the NU.

In FIG. 1, it can be seen that the RUs 55 and PRUs 56 are located in the telephone closets while the NUs 53 are located at each workstation. Functional descriptions of each of the block diagram elements is provided below. The functional descriptions of the NU and RU change somewhat depending on which LAN variant is involved (i.e. two or four wire and DOV or DO).

The two-wire Data Only (DO) variant (half-duplex) can be implemented with spare inactive telephone wiring or by using the two unused wires that go to most phone instruments in an active circuit.

The four-wire DO variant (each pair simplex) would most likely be implemented on spare inactive wires.

Either the four or two-wire data-over-voice (DOV) variants would be implemented on active circuits. In the four-wire DOV variant (each pair simplex) both the active voice pair and the non-voice pair would be used. In the two-wire DOV variant (half-duplex), the voice pair is used.

It is also possible to combine DO and DOV techniques in the same network installation. For example, two data communication channels (2 wire DOV and 2 wire DO) could be implemented on the four wires going to a phone instrument. The voice pair would be implemented as the two-wire DOV and the non-voice pair as the two-wire DO. Of course, the RU design would need to be able to accommodate both types of interface.

Figure 3:
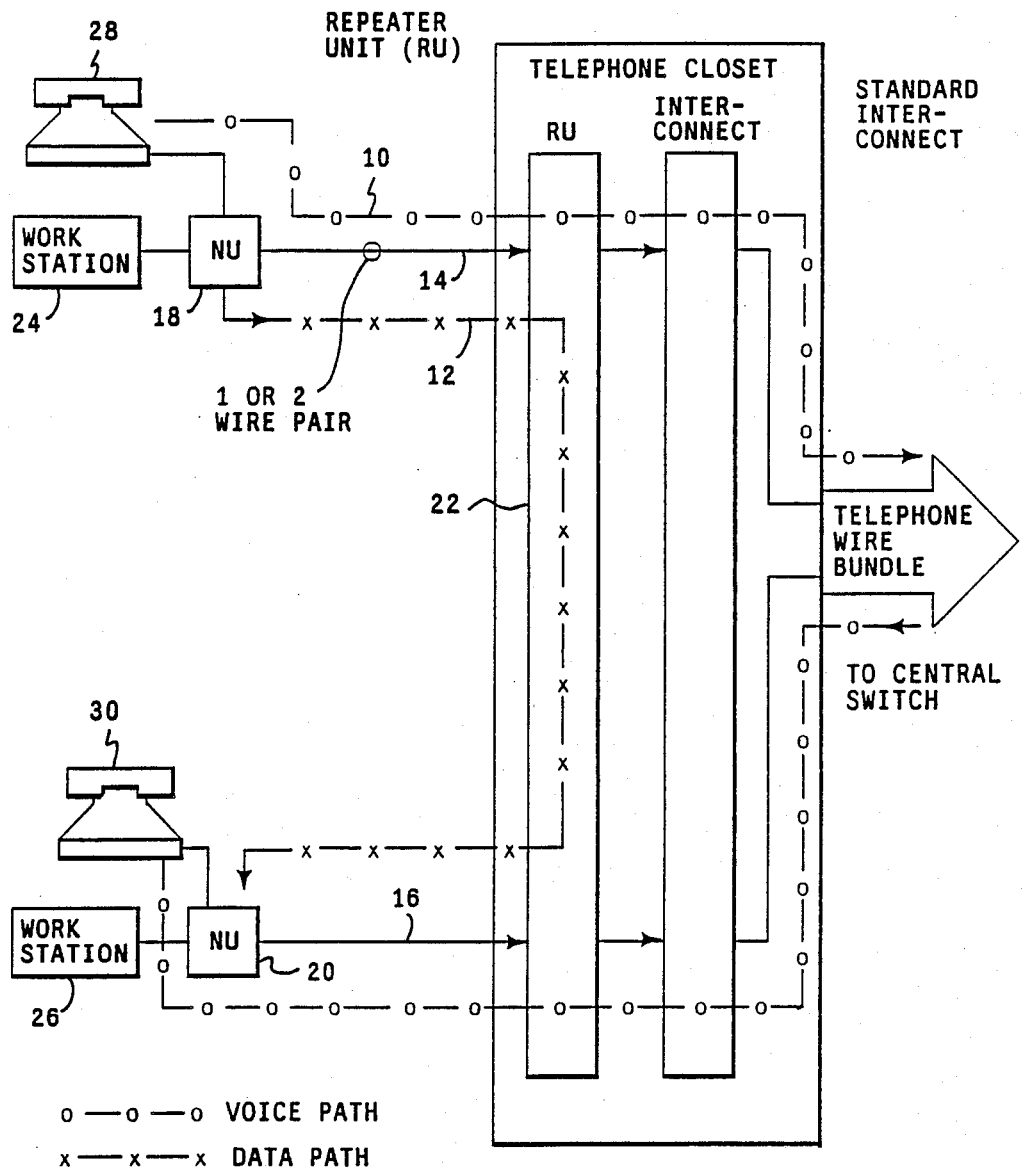
FIG. 3 is a block diagram of a local area network with a voice path and a data path.

In the DOV implementation, this invention superimposes digital baseband data signals over the voice signal on the telephone network. This is accomplished completely independent of the use of the phone system for voice communications and allows Station A to simultaneously have voice communication with Station B and data communication with Station C (or a multitude of other stations on the LAN as in mail or messaging broadcast transactions). The data and voice paths are independent and, in particular, the data path does not involve the central PBX hub (see FIG. 3). The voice network remains a star functionally and topologically and, while the data network physically appears to have a star topology, it functionally behaves as a bus. Thus, it can be called a "star bus". The link of wire from the telephone closet to the phone instrument is termed a radial arm, and the function at the user end of the radial arm is termed a workstation node (whether it be a telephone, personal computer or some type of server).

Node Unit

Each workstation 51, FIG. 1, connected into the network requires a NU 53 at the workstation location. If there is an active telephone at the location being networked, the NU is inserted between the RJ-11 wall connection and the phone instrument. It also has an appropriate interface connector for connection to the networked equipment. At a minimum, the NU performs the following functions:
line driver for the baseband signals;
line receiver for the baseband signals;
line termination for the baseband signals;
filters out the low frequency data signal energy so that it does not get onto the phone line;
filters the high frequency energy injected onto the line to keep it from getting into the phone instrument circuits in DOV implementations;
filters out voice band and signalling energy so that it does not get into the data communication circuitry in DOV implementations;
provides a communication interface to the host equipment being networked.

In addition, the NU could be made smart enough to perform many of the communication processing tasks like packet encoding/decoding, address matching, collision detection, error management, etc. Otherwise, the host processor will need to perform these tasks but this decision is not relevant to this invention disclosure which only requires the minimum capability defined.

Repeater Unit

The RU 55, FIG. 1, is a multiport device relative to workstation inputs (e.g. sixteen might be a convenient number of inputs). The I/O port interface to each networked device will have two or four wires depending on whether a two or four wire scheme is being used (two-wire is half-duplex, four-wire is simplex, for each wire pair).

In addition to the I/O interface to networked devices, the RU has an internal pseudo bus node with an external bus node expansion (BNE) interface for linking to other RUs (sometimes via a PRU). Like the I/O interface, the BNE interface can be either a two-wire half-duplex or four-wire simplex configuration. This will be described in conjuncture with FIG. 4.

The Repeater Unit 55, FIG. 1, is placed in the telephone distribution closet containing the phone line from the instrument associated with the node to be networked. This is where that line is connected to a main wire bundle which eventually connects the phone instrument to a central PBX (Private Branch Exchange). The RU contains a very small amount of circuitry and requires electrical power (phone closets normally have electrical outlets). The RU is completely dumb, only performing a few simple electrical functions. It is described in more detail in the technical description that follows. With the RU in the closet, the wires associated with (from) the workstation being networked are removed from the termination block, which is connecting them to the wire trunk going to the PBX, and instead are connected to a similar set of connectors on the RU. Jumper wires are then placed between another set of connectors on the RU and the original terminals on the termination block. Thus, the RU circuitry, for each networked connection, is inserted between the individual instrument lines and the connection to the distribution wires which complete the circuit to the PBX. The RU would normally be designed to handle a large number of channels as needed for different applications (for example, there could be several models with eight, sixteen, or thirty-two channels). Furthermore, RUs can be interconnected for networked expansion. The process of adding NUs and connecting to the RU is repeated for every node added to the network. Additional RUs are only added when the capacity of existing RUs is exceeded. RUs located in different closets can be interconnected with lines that already run between the closets so that the network is not limited to stations only served by a common closet (See FIG. 9).

The functions of the RU are as follows:
provides a line driver/receiver capability to the I/O interface;
provides a line driver/receiver capability to the Bus Node Expansion BNE interface;
when it receives a signal on one of its input lines, it repeats (echos) the same signal back on all the outgoing I/O lines (except for the line being used by a talker in a two-wire scheme where it cannot listen while its talking) and on the BNE interface;
filters out the low frequency data signal energy so that it does not get onto the phone line;
filters out the high frequency data frequency energy that was put onto the line so that it does not go to the PBX;
provides a line termination to the data signals;

Pulse Regenerator Unit

The PRU 56, FIG. 1, is used on the BNE bus as needed to reshape and retime the data signal.

System Description

Implementing the disclosed invention requires, at a minimum, use of the two previously described pieces of hardware, a node unit (NU) at each workstation node location and a repeater unit (RU) which is located in the telephone distribution closet. These telephone distribution closets are strategically located within a building facility, typically within a 200 foot radius from any telephone instrument. The design details for the NU and RU will vary somewhat depending on the specific system variant; however, the differences are not major. The inner workings of these functions will be discussed in conjunction with indicated figures in conjunction with the detailed description. In this discussion, the system variants will be discussed at the black-box level.

Four-Wire, Data Only (DO)—The basic concept can be illustrated by referring to FIG. 1. Each of the functional elements are shown from a general network configuration that links a population of workstations (workstations 51a to 51z). Each workstation has an associated node unit (NU) 53a to 53z and the repeater units (RUs) are shown within the distribution closets. As many RUs 55 as are needed can be interconnected within a single distribution closet or between closets. There is no practical limit from electrical concerns because the RU terminates and isolates each radial arm. Each line between the NUs 53 and RUs 55 is a single twisted pair 57a to 57n operated in a simplex mode. Functionally, the RU 55 is dumb and it simply repeats on all outgoing lines (arrows away from RU) what it hears on incoming lines (arrows towards RU). Thus, when one workstation 51a is talking to the network through its sending line 57a, all other workstations hear through their associated receive lines. Functionally, this appears to be a linear bus although topologically, it appears to be a star. Of course, the access protocol could be whatever is desired (e.g., token passing, CSMA, CSMA/CD).

This four-wire data-only approach can be implemented using the spare inactive telephone wiring that exists in almost every building. In this case, installing a network would involve about the same amount of labor as putting in telephone extensions (labor for a telephone extension equals the labor to install network node).

Two-Wire, Data Only (DO)—The block diagram in FIG. 2 for this technique is similar to that in FIG. 1 with the exception that there is a single-half duplex wire pair running between each NU 63a to 63z and RU 65. Consequently, once a workstation 61a to 61z starts talking on the line, it cannot listen and detect collisions. This technique would be limited to a CSMA access method without collision detection or token passing. This also requires some special circuit techniques, however, one advantage being that it can be installed on one pair of the four wires normally going to each phone instrument. In most cases, it would be possible to establish a LAN with the existing wires already committed to use.

Four-Wire, Data Over Voice (DOV)—To describe the 4-wire DOV version of the disclosed system, reference is again made to FIG. 1. At this block diagram level of detail, the only difference that would appear is the addition of a phone instrument connected to each NU (see also FIG. 3). This technique superimposes a digital baseband communication channel on top of the analog voice channel. The two communication channels are completely independent of each other and could both be operating at the same time and to different stations. The key technical issue in this approach is the development of adequate hardware system techniques (signaling, circuitry and filtering) which provide sufficient isolation to keep the energy from the digital communication leaking into the voice circuit and degrading voice communications.

Two-Wire, Data Over Voice (DOV)—The 2-wire DOV approach is similar to the functional block diagram of FIG. 2 with the exception of the addition of the phone instruments to the NU. And, like the 2-wire DO approach, the links between the NU and RU are half duplex so that the access protocol will be CSMA or token passing.

The technical description that follows will be given for the most complex DOV (data over voice) approach. The differences between the DOV and DO (data only) approaches are quite simple and will be discussed.

DETAILED DESCRIPTION OF THE INVENTION

To start the technical discussion, reference is again made to FIG. 3 where the voice 10 and data 12 paths are shown. Assuming one of the wire pairs 14, 16 between the NU 18, 20 and RU 22 contains both voice and baseband digital data, the digital signals are blocked by an appropriate set of filters from going beyond the RU 22 in one direction and the NUs 18, 20 in the other direction. Proper terminations for the baseband digital signals at each end of the lines ensure that there are no reflection problems. All of this circuitry is invisible to the voice functioning of the telephone system. Link 14, 16 shown in FIG. 3 (which is termed a radial arm) actually consists of one or two wire pairs in the telephone cable, (depending on whether a two or four wire implementation is used). Assuming a four wire scheme, each pair is operated in a simplex mode where from the station node's 18, 20 point of view, one pair is a sending line which it uses when it wants to talk on the network and the other pair is a receive line with which the station is constantly listening for network activity. Every node 18 on the network has the same two line pairs and will hear network activity through its receive line. Attempts by more than one station 24, 26 to transmit at the same time will produce collisions that are detectable by all stations. Thus, although the network appears topologically to be a star, its behavior is that of a linear bus.

Figure 4:
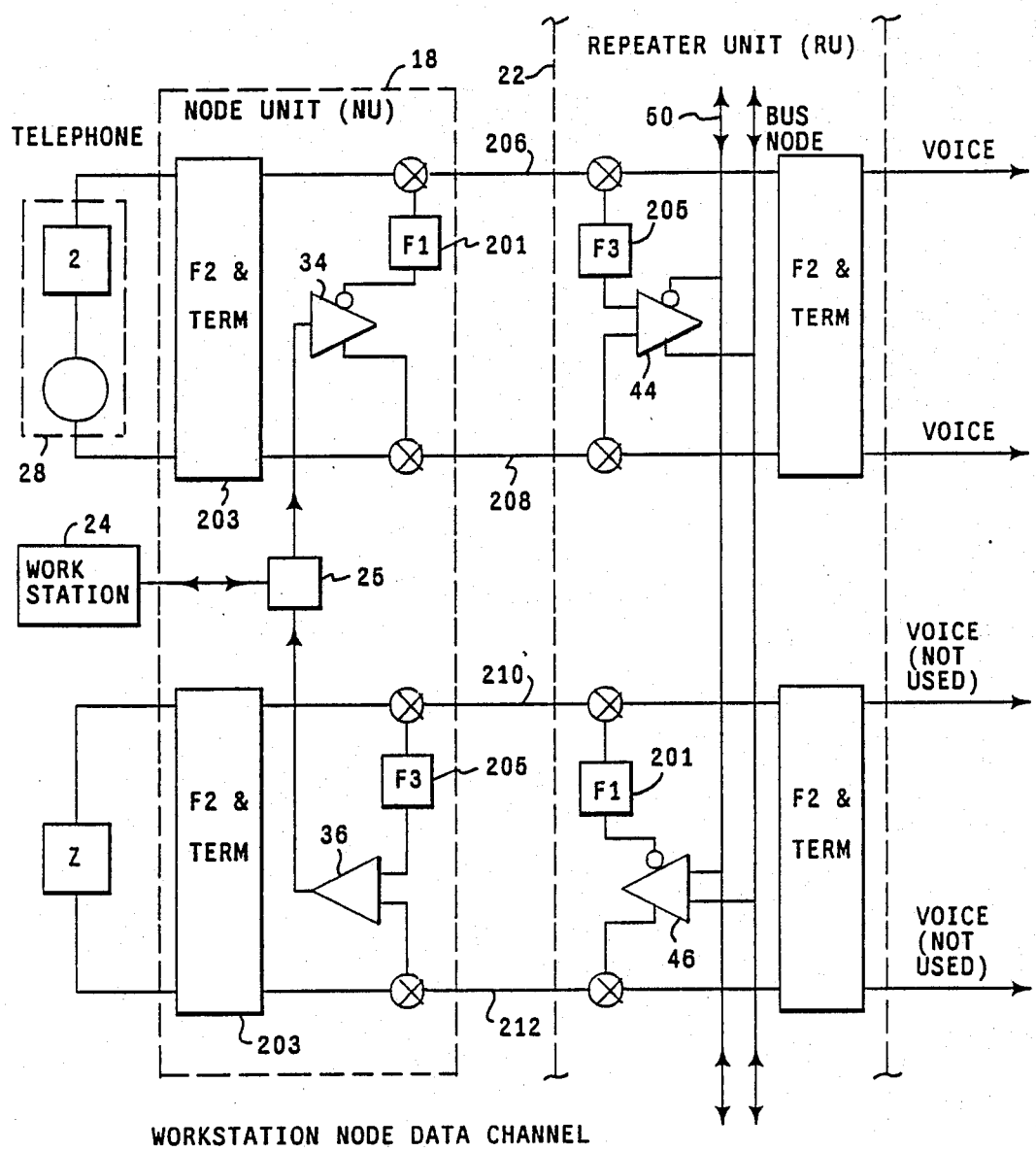
FIG. 4 is a block diagram of a workstation configuration in conjunction with the present invention.

A more detailed functional block diagram level examination of the transmit and receive lines and associated circuit techniques for a single station's node is shown in FIG. 4. FIG. 4 discloses a four-wire simplex/half duplex system and could comprise the top workstation 51a, node unit 53a and repeater unit 55 shown in FIG. 1, for example. The function of the RU 22 can now be clearly seen. A key feature is an internal bus node which is driven by any station 24 wanting access to the network. It is also a common input to all drivers which drive the receive line signal back to the stations. This node can simply be connected between repeater units to expand the network. In FIG. 4, the bus node expansion (BNE) is shown to be a single wire pair. Consequently, signals must be able to be communicated along the bus in either direction. This is a half-duplex bus but it could also be implemented with four wires in a simplex mode. The different options for implementing the BNE bus are discussed in more detail later. The other functions of the RU are: (a) isolate and buffer the various transmit and receive lines, (b) provide a termination for the data signals, (c) block (filter) the digital signals off the lines so that they do not get past the closet. The NU, as shown in FIG. 4, provides: (a) the drive interface to the transmit pair, (b) the sense interface to the receive pair, (c) terminates the digital signals, and (d) blocks the low frequency energy from the digital signals from getting into the phone circuit. Because of the very limited length between the node unit NU and repeater Unit and RU (which is independent of the overall size of the network), the electrical environment for the data signals is quite good. For most applications none of the links would exceed 200 feet.

Still referring to FIG. 4, it can be seen that there are three filter functions identified, Filter 1 (201), Filter 2 (203) and Filter 3 (205). Because of the fact that these filter designs are key technical issues in the Data Over Voice approach, they will be briefly discussed.

Filter 1 (201) is a high pass filter and its main task is to provide sufficient attenuation at voice band frequencies so that low frequency energy from the digital channel does not get into the voice circuit. Even though the digital data signals at about 300 KHz are well above the voice band, the low frequency splatter is a consequence of the occurrence of low PRFs (Pulse Repetition Frequencies). For example, a single square wave pulse has a continuous frequency spectrum within the sin(x)/x envelope.

Filter 2 (203) is a line termination for the digital data signals and is a low pass filter. Its primary job is to keep the high frequency energy generated by the digital communication channel from getting into the voice circuits. It also keeps the digital circuit from being disrupted if the ends of the wires are shorted, etc.

Filter 3 (205) is used for the sense (receiver) function on the line. Like F1, it is also a high pass filter and in many cases, it is possible to make F1 and F3 the same. However, for complete generality, in this description, it is identified separately. The requirements on F3 are that it provides sufficient data signal coupling without loading the voice circuits.

Very stringent performance objectives may require that one or both of these filters be active; however, in a DOV test system which has been built and tested, Filter 1 is a single capacitor and Filter 2 is a single LC stage. With this design, there is no detectable deterioration in the quality of the voice circuit, but the design must ensure compliance with FCC Part 68.

In operation, telephone 28 can be used independently of the digital data aspects of the system. That is, the telephone 28 is connected to the normal output telephone wires which are directed to the telephone closet and subsequent cable to another closet and/or the central PBX. Filters are included, as described above however, to keep the voice data out of the digital data signals and vice versa.

In the digital data operation, the workstation 24 (a personal computer, computer terminal, etc.) would be coupled to the amplifiers 34 and 36 via connector circuit 25. This box 25 would comprise standard circuit components to match impedance and voltage levels of the various personal computers and computer terminals with that of the amplifiers in the node unit 18. Signals from the workstation 24 would pass through connector circuit 25 to amplifier 34. This amplifier 34 couples the digital data signals to the single wire 206 and single wire 208 in this simplex system. At the repeater unit 22 in the telephone closet, the digital data signals are amplified again by amplifier 44 and sent out over the bus node 50. In the receiving mode, signals on the bus node 50 are amplified by amplifier 46 for placement of the digital data signals on single wire 210 and single wire 212. These signals are received and amplified by amplifier 36 and sent to the workstation 24 via connector circuit 25. Again, the voice data signals and digital data signals are excluded from the other's system by the operation of Filters 1, 2, and 3, described above.

Figure 5:
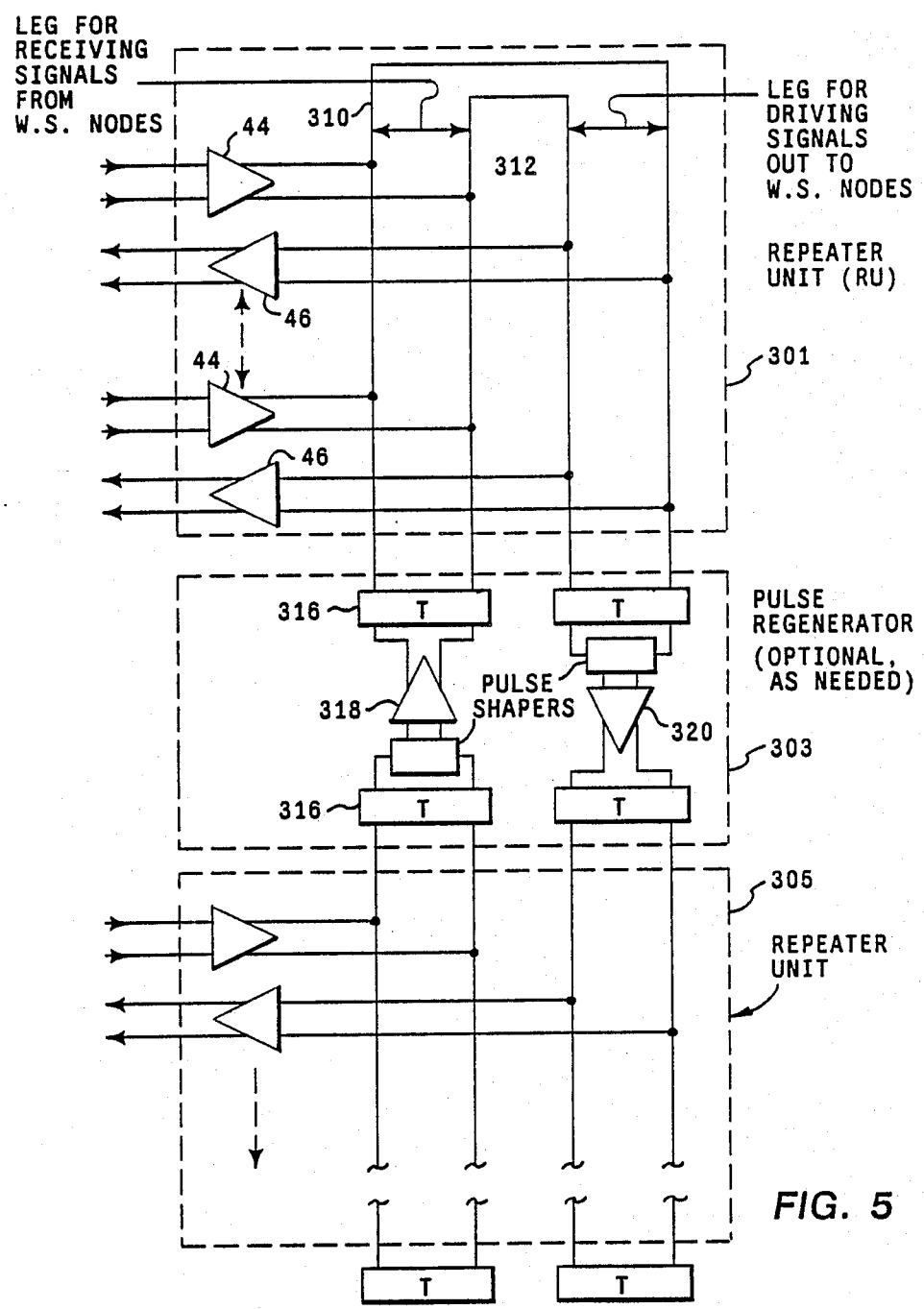
FIG. 5 is a circuit diagram of a repeater unit bus implementation for large networks.

FIG. 5 shows two repeater units with a four-wire simplex pseudo bus node, but separated by being in different, and possibly distant, telephone closets. Schematically, output amplifier 44 outputs onto bus node lines 310, 312, the data signals to be sent to another workstation. The signals travel up and over the top legs of the bus node leads to the leg for directing the data signals back to another workstation, such as that received by amplifier 46. However, if the workstation to which the digital data signals are directed is not coupled to the same repeater unit, then it may be desirable and/or necessary to use a pulse regenerator 303, typical in the industry. This pulse regenerator 303 must have terminal impedances 316 to properly terminate the lines in their characteristic impedance but also contain the proper amplification and returning circuits 318, 320 to properly pass the signals on to the next repeater unit.

Figure 6A:
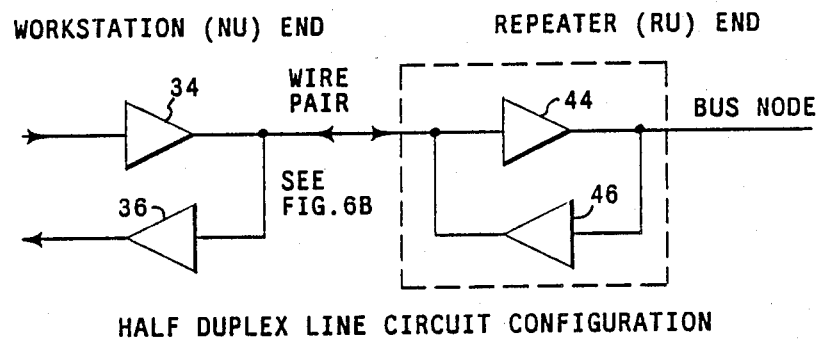
FIGS. 6a and 6b are a half duplex line and functional block diagram of one receiver/driver circuit, respectively.
Figure 6B:
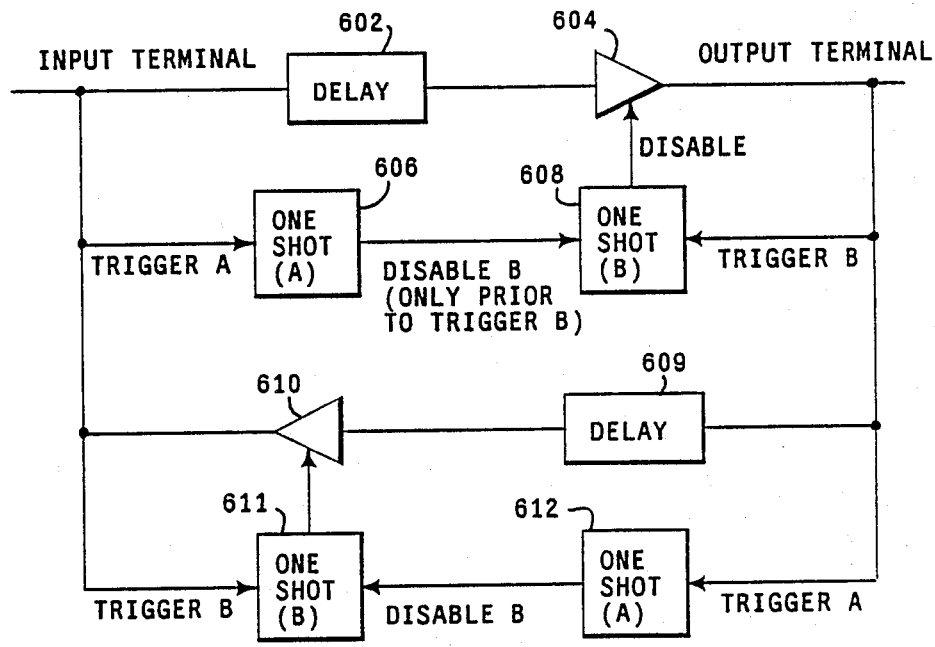

The description to this point was directed mainly to four-wire simplex techniques. Two wire techniques in half duplex modes can also be implemented. Using one pair of wires in a half duplex mode for the two wire system will, however, require some special circuit techniques. The special techniques required involve the line driver/receiver circuits. FIG. 6(a) is a functional block diagram of the transceiver pair at each end of the half duplex line. The difficulty occurs at the repeater unit end where the same bus node that is driven, is sensed to be driven back along the same line. The solution is to design the transceiver drivers in the RU so that they are deactivated for a period of time if they are driven at the output terminal before the input terminal. With this characteristic, the transceiver pair can only drive in one direction at a time. The simultaneous apearance of a signal within a specified time window could result in the amplifier in both directions blocking for the time out period. It is also possible for more than one workstation to acquire the RU bus node in contention type access methods. In either case, these occurrences are readily handled by network protocols. A simplified block diagram in FIG. 6(b) shows how this characteristic can be obtained. The delay ensures that the backward driver is deactivated before the forward one starts talking.

The incoming data signal in FIG. 6b from a workstation would be applied to the input of delay circuit 602 and also to the trigger input of one shots 606 and 611 at the same time. When one shot 606 is triggered, its output acts to disable one shot 608 for a specified time out interval (if one shot 608 has not already been triggered). Similarly, when one shot 611 is triggered, its output acts to disable amplifier 610 for the same time out interval. This time out interval is selected to be somewhat longer than one bit time so that both one shots 606 and 611 are continuously maintained in a triggered state as long as data is being transmitted. Upon cessation of data transmission, one shots 606 and 611 will reset after passage of the time out interval thus freeing one shot 608 to be triggered and amplifier 610 to be an active state. The incoming signal is delayed long enough to allow the amplifier 610 going the opposite direction, to be disabled by the incoming signal acting on one shot 611 before that signal appears on the input of amplifier 610. The delayed data signal would thus be eventually applied to amplifier 610 but it would not be amplified and transmitted because it has been disabled by detected receipt of incoming data from the reverse direction via one shot 611. Of course, if no incoming data was detected by one shot 611, the digital data applied to amplifier 610 from delay circuit 609 would be transmitted over the line. In order to prevent one shots 608 and 611 from detecting the output of amplifiers 604 and 610, respectively, as incoming digital data, the outputs from one shots 606 or 612 would have already disabled one shots 608 or 611 from transmitting their own disable signals to amplifiers 604 or 610. Both amplifier circuits 44 and 46 representatively shown in FIG. 6A comprise the circuit in FIG. 6B which allows data signals to be transmitted in the forward or reverse directions, but not at the same time.

Lan Architecture

Figure 7A:
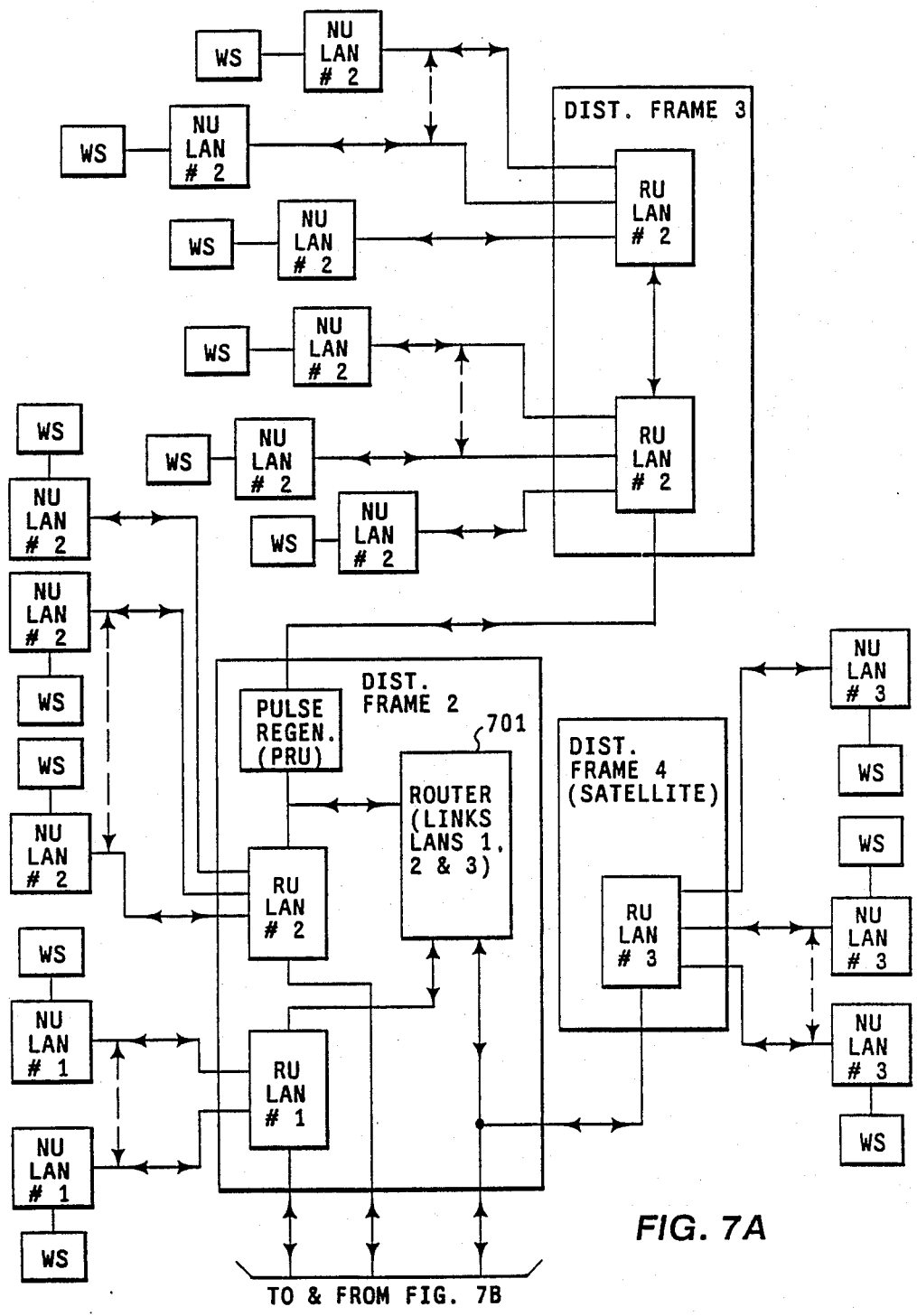
FIGS. 7a and 7b are a general architecture block diagram of a typical LAN system.
Figure 7B:
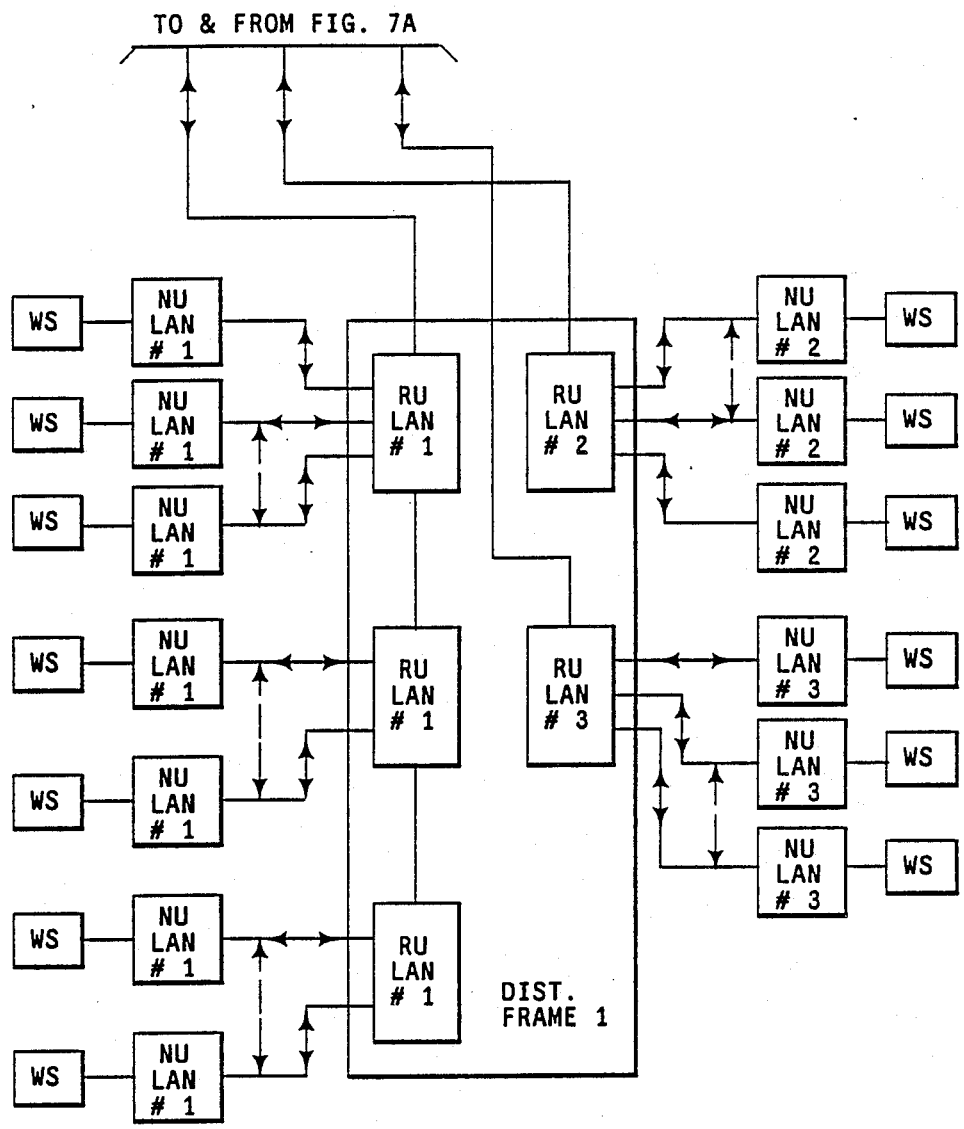

A detailed description of the LAN architectural concepts defined in this invention will be provided by examining the specific example of FIG. 7.

In this example of LAN architecture, a LAN structure is illustrated which; (a) consists of three distinct LANs, #1, #2, and #3, b) involves four telephone closet distribution, frames 1 to 4, and has the LANs linked through an intelligent router 701 which provides address filtering to prevent unnecessary traffic on individual LANs. The lines shown connecting the RU pseudo bus node expansion ports between RUs consists of either one wire pair, in which case it operates in a half-duplex mode or two pairs, in which case each operates in a simplex mode.

Starting at distribution frame #1, it contains five RUs, three interconnected for LAN #1, and one each for LAN #2, and LAN #3. The lines shown connecting the workstation NU's to the RUs consists of either one wire pair, in which case it operates in a half-duplex mode, or two wire pairs, in which case each operated in a simplex mode. The RU pseudo bus node, for each LAN, is shown extending from distribution frame #1 to distribution frame #2 and (in the case of LAN #3) on to distribution frame #4 (since in there was no direct wire running from distribution frames #1 to #4).

The intelligent router 701 is located in distribution frame #2 so that the extended pseudo bus node of all LANs must go to distribution frame #2 if they are to be linked to the other LANs. The intelligent router 701 could be a program controlled computer or, of course, a hard wired circuit.

Also note that in distribution frame #2, a pulse regenerator (see also FIG. 5) is required for LAN #2's RU extended pseudo bus node linking distribution frame #2 to distribution frame #3.

Repeater Unit

As stated previously, a major element of this LAN concept is the repeater unit (RU). Functionally, the RU can be described as a multi-port dumb repeater. It has separated input and output ports for the four-wire simplex mode version (for example, FIG. 4) and combined input/output ports for the two-wire half-duplex mode (for example, FIG. 2). When a signal is inputted to the RU, it will echo the signal out of each output port and also at the RU pseudo bus node expansion port for linking to other RUs. RUs may be designed to have different numbers of I/O ports if desired to accommodate different application needs (e.g. 16, 24, 32).

Figure 8:
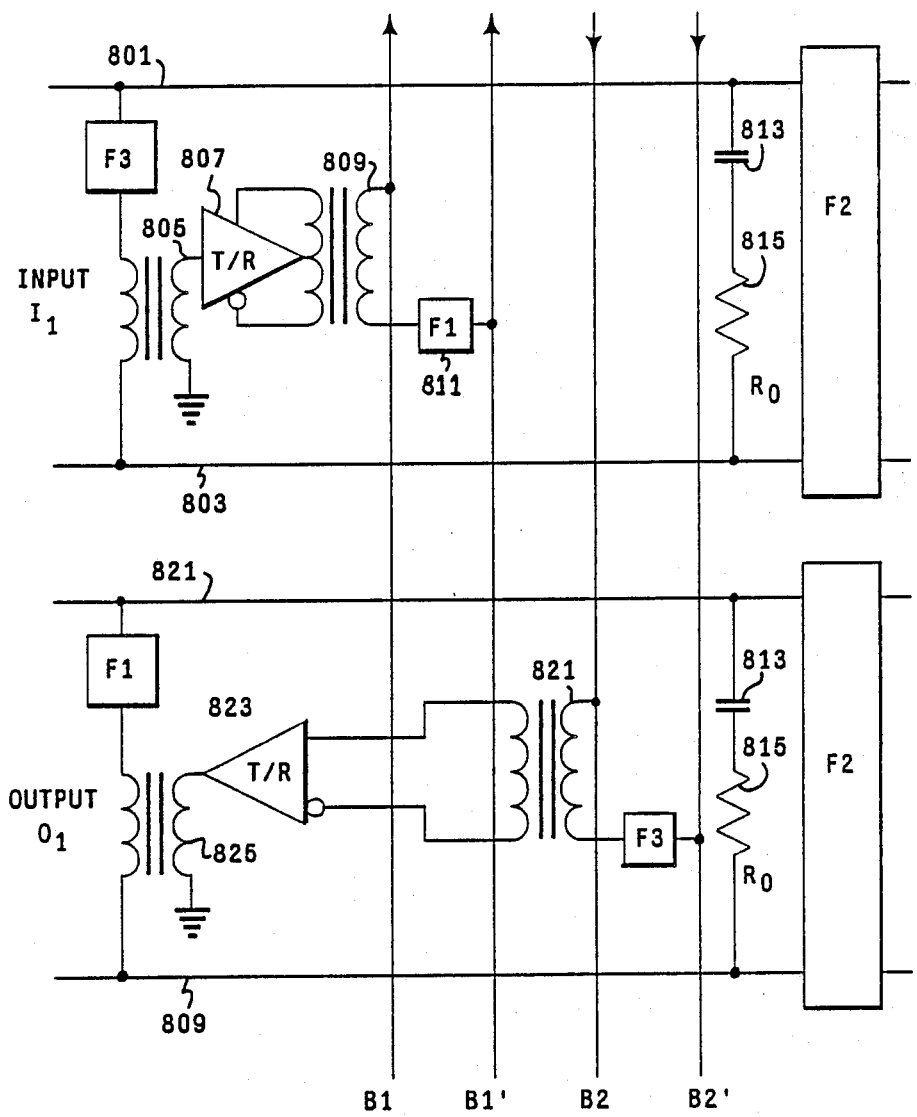
FIG. 8 is an example of a simplex/simplex configuration of a repeater unit (RU)
Figure 9:
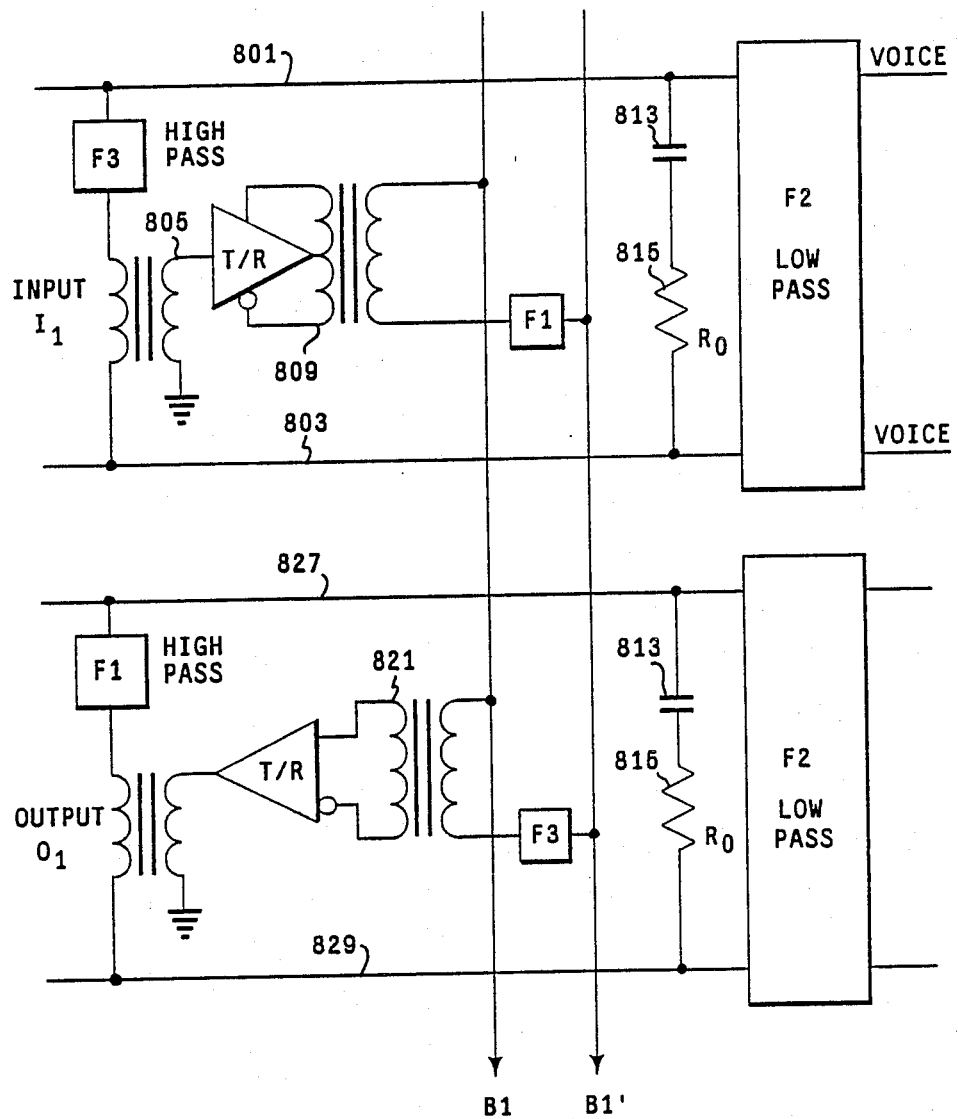
FIG. 9 is an example of a simplex/half-duplex configuration of configuration of a repeater unit (RU)

There are four basic variations possible for the RU depending on; (a) the type of I/O lines and (b) the type of pseudo bus node implementation (they will be named by the type of communication on the I/O port and pseudo bus node expansion port e.g. simplex/simplex). They are illustrated in FIG. 8 (simplex/simplex). FIG. 9 (simplex/half-duplex), FIG. 10 (half-duplex/simplex), and FIG. 11 (half-duplex/half-duplex). Initially the basic functionality of the RU is described with the aid of these block diagrams followed by circuit details for a specific implementation.

Provided below is a summary list of key features of the RU where the references in parentheses can be found in FIGS. 8 through 11;

(a) provides a transmission line characteristic termination (Ro) for the baseband signals;

(b) provides high pass filtering (F1) to keep low frequency signal energy off the telephone line;

(c) provides low pass filtering (F2) to keep high frequency signal energy from going to the PBX;

(d) contains an internal pseudo bus node with appropriate drive electronics to enable the interconnection of RUs to create a general LAN structure. There are two basic options for extending the RU pseudo bus node, depending on whether a four or two-wire scheme is used; (1) the pseudo bus node may consist of two signal line pairs (B1, B1' and B2, B2' of FIGS. 8 and 10) each operated in a simplex mode, or (2) the pseudo bus node may consist of a single line pair (B1, B1' of FIGS. 9 and 11) operated in a half-duplex mode (requires use of the half-duplex bidirectional driver of FIG. (6);

(e) contains line receivers and drivers which are AC coupled to the telephone line (transformer preferred) and operate in a balanced differential mode (T/R in FIGS. 8–11).

(f) it may be desirable to put a pulse regenerator function in the RU also, but in this disclosure, the pulse regenerator will be described as a seperate standalone function.

Using the simplified block diagram of FIG. 8, the input signals from a workstation Node Unit (NU) would be applied to the RU through a telephone wire pair to illustrate the operation of a simplex/simplex RU, at input I. The descriptions of FIGS. 1 and 4 above are also applicable here, except that the function of the RU is expanded to show actual internal circuitry and operation. The input signals on lines 801 and 803 are applied to filter F3 and the input to transformer 805. The filter F3 operates as a high pass filter and would prevent any voice data from entering the digital data circuitry. Any voice data would continue out to the right of FIG. 8 to subsequent telephone circuits, such as the PBX location. Transmit amplifier 807 amplifies the digital data signal and applies it to lines B1 and B1' via output transformer 809. Capacitor 813 and characteristic impedance Ro 815 act to terminate the line in its characteristic impedance to prevent signal reflection. Filter F2 is a low pass filter to allow the low frequency voice data to pass unimpeded while preventing the high frequency digital data from passing.

B1 and B1' are eventually connected to B2 and B2' in this simplex implementation of the pseudo bus node (see FIG. 5). As the signal propogates down B2 and B2', it is applied to receive amplifier 823 via transformer 821 and a filter F3. After amplification by amplifier 823, the signals are presented back to the workstation via a filter F1 on lines 827 and 829.

A signal appearing on any of the input amplifiers (807) will drive the bus node pair (B1/B1') associated with the inputs to the RU. The signal will propogate in both directions along B1/B1'; however, only amplifier outputs are connected to B1/B1' so that it has no effect on them. Also, if pulse regenerators are used in the simplex bus node case, they will only pass in the designated direction. The corresponding B1/B1' and B2/B2' buses (wire pairs) are connected together between RUs so that the signal will continue to propogate along the B1/B1' bus until it reaches the last RU (at the end of the bus). In this RU, the B1/B1' and B2/B2' buses are connected together so that the signal continues to propogate along the B2/B2' bus until it reaches the last RU on this half of the bus. At this point, a characteristic impedance termination is placed. As the signal propogates along the B2/B2' portion of the bus, the outputs On are activated, thus echoing the signal back to all the workstations. The disadvantages of the simplex RU bus node implementation are; it requires two wire pairs to implement, and because of the loop back topology, the total delay of the extended pseudo bus node is doubled.

In the simplex/half-duplex configuration of FIG. 9, the input and output portion of the circuit works the same as described in FIG. 8. However, in this case the bus node operates in a half-duplex mode so that any pulse regenerators used must be able to pass the signals in both directions. A signal driven onto the RU bus node B1/B1' by one of the input amplifiers will travel in both directions along the bus node activating the output amplifiers as it does. At both ends of the bus node a characteristic impedance termination is placed.

Figure 10:
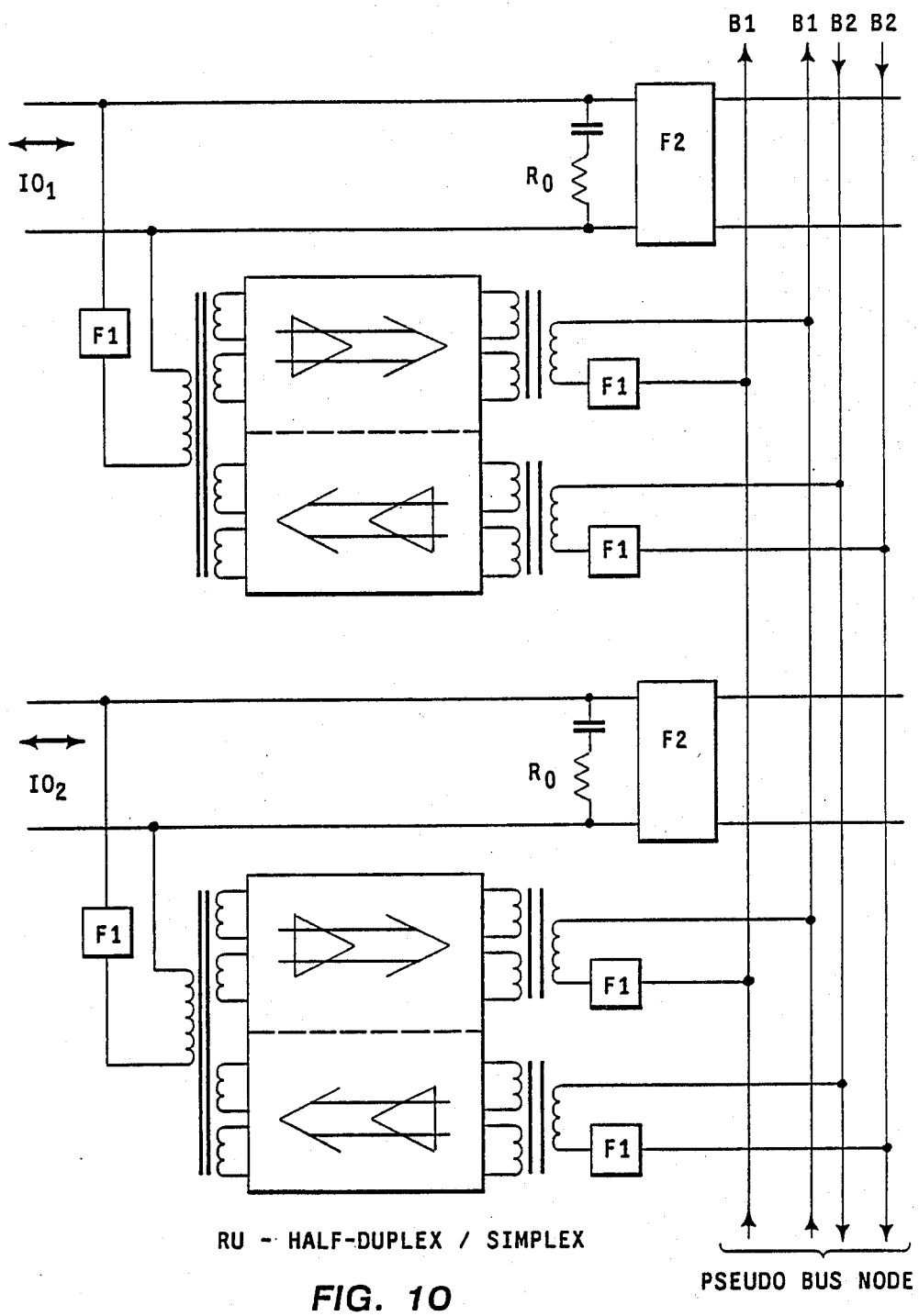
FIG. 10 is an example of a half-duplex/simplex configuration of a repeater unit (RU)
Figure 12:
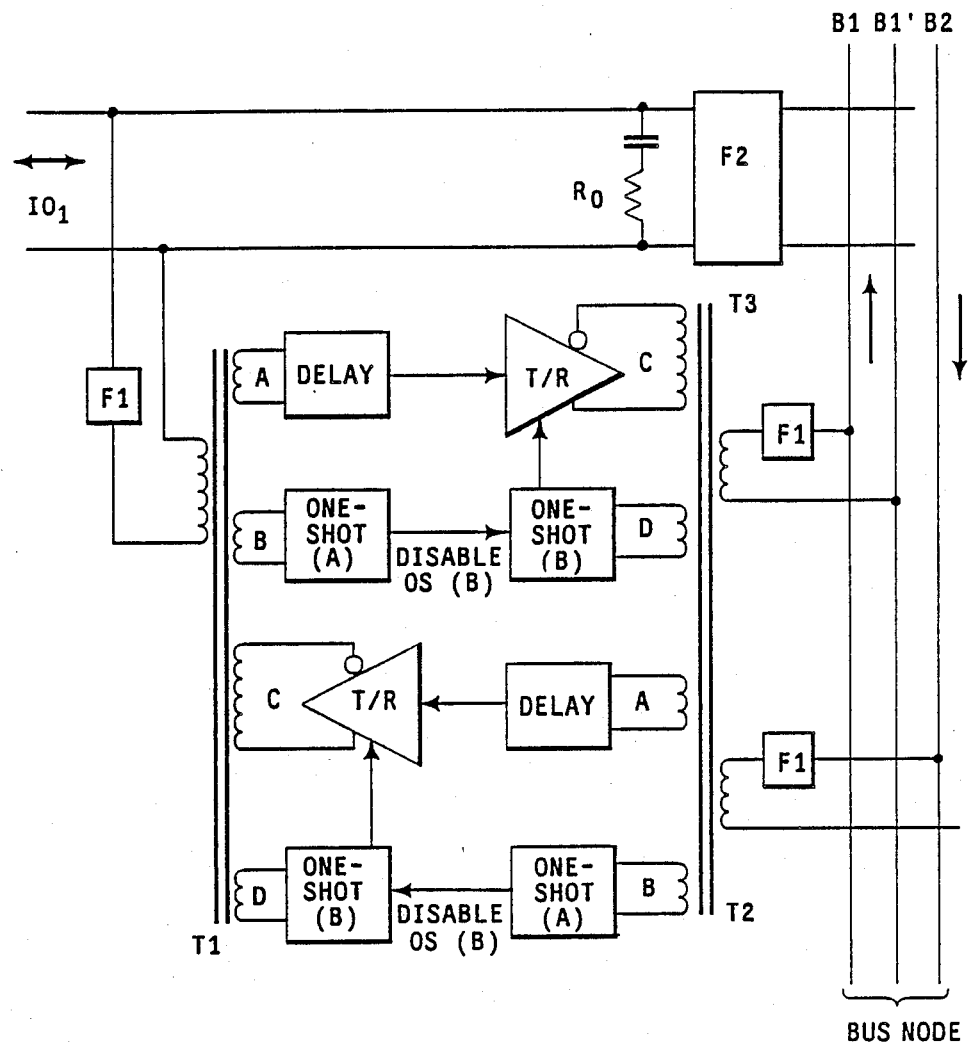
FIG. 12 is an example of a half-duplex/simplex bidirectional driver.
Figure 13:
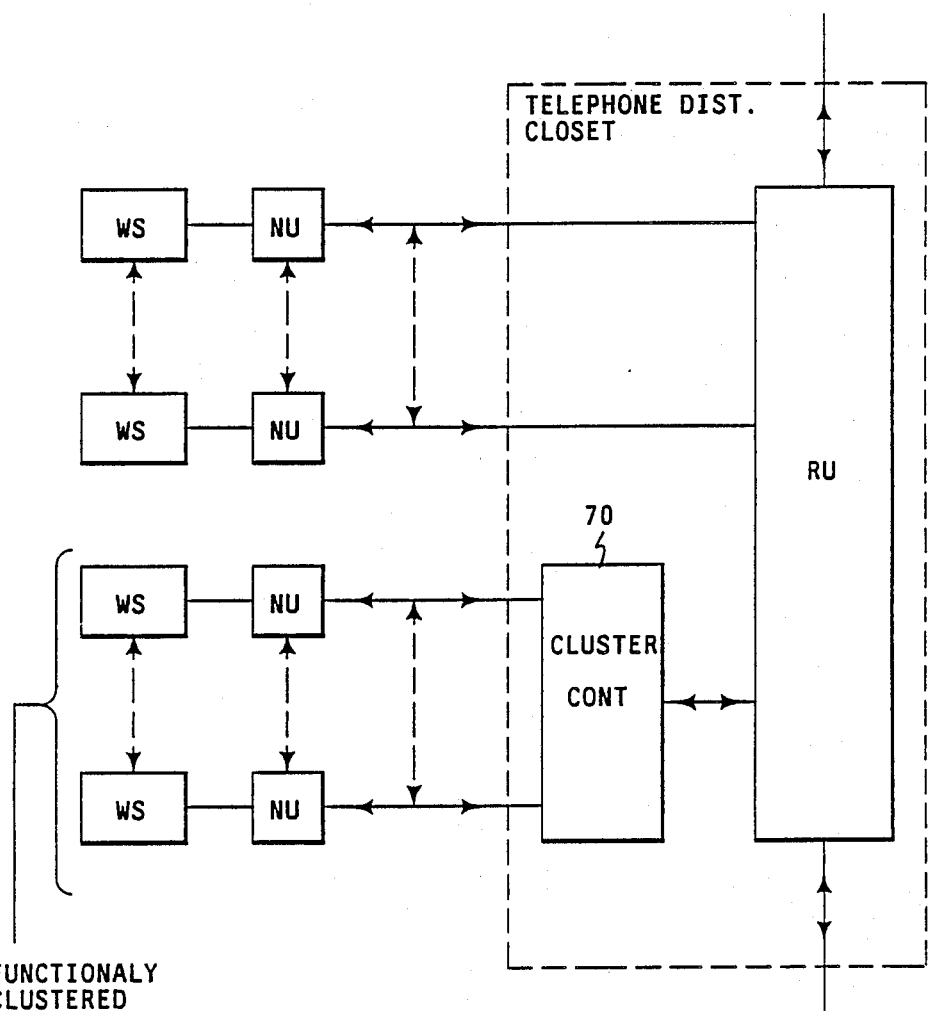
FIG. 13 is a block diagram of a LAN with a cluster controller.

The half-duplex/simplex configuration of FIG. 10 uses a special bilateral amplifier circuit of the type described above in FIG. 6. This amplifier reverts to a unilateral configuration (left-to-right or right-to-left) during signal transmission plus a time-out period. The direction of transmission depends on which input terminal the signal first appeared. A more detailed diagram of this circuit is provided in FIG. 12. Basic operation of this circuit has been previously described in detail. The only difference from the preceeding discussion is the addition of transformer coupling to the input and output portions of the bidirectional drive. In this half-duplex/-simplex configuration, a single transformer T1 is used on the two-wire half-duplex interface which separate transformers T2 and T3 are used on the four-wire simplex side. Signals coming from the half-duplex side are simultaneously applied to each of the uni-directional halves of the bidirectional circuit. On the simplex side of the circuit, T2 couples signals onto the RU pseudo bus node pair B1/B1' while transformer T3 couples signals from the pseudo bus node pair B2/B2' to the amplifier which will drive this signal onto the half-duplex side of the quiescent stations.

Figure 11:
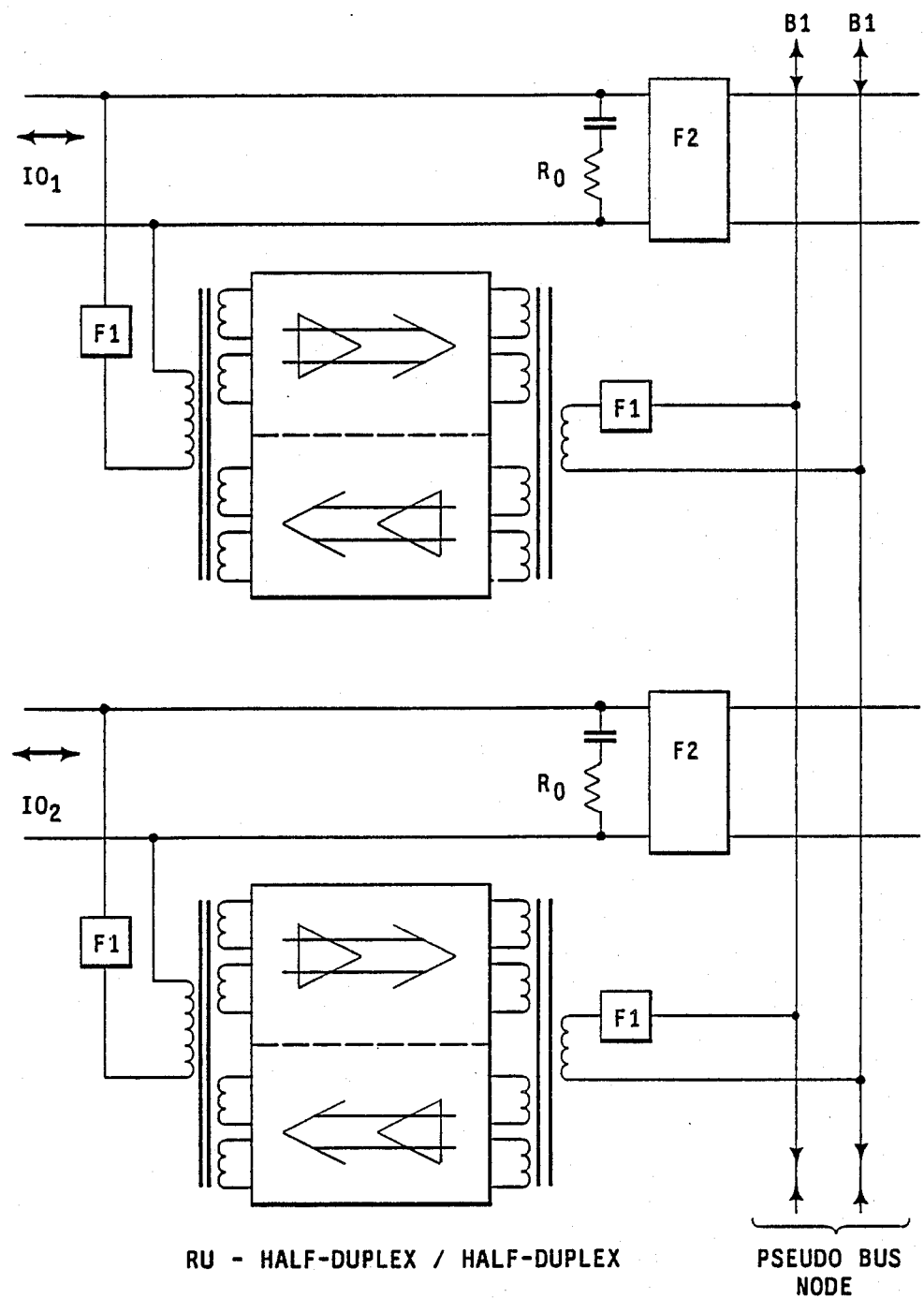
FIG. 11 is an example of a half duplex/half duplex configuration of a repeater unit (RU)

The half-duplex/half-duplex configuration of FIG. 11 can be understood from the previous discussions. FIG. 15 provides details of the half-duplex/half-duplex bidirectional drive. The only difference from FIG. 14 is the combining of T2 and T3 into a common transformer T2.

Figure 14:
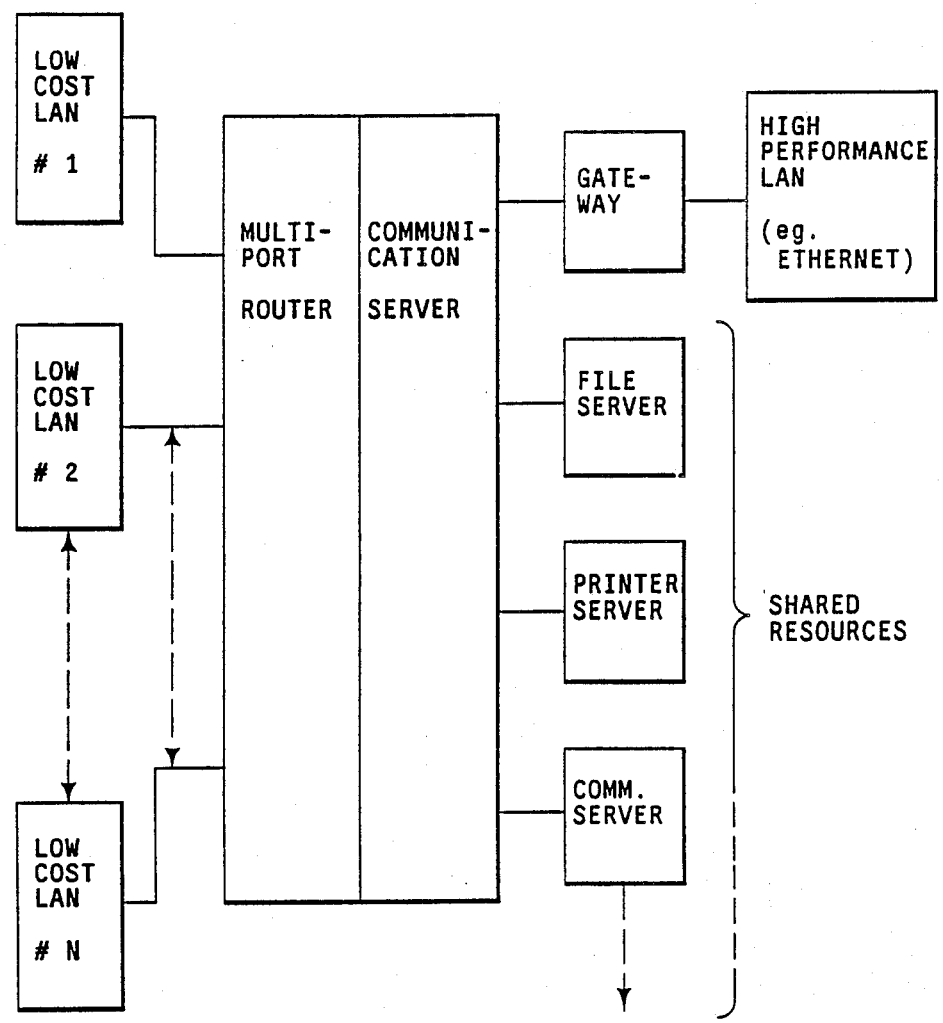
FIG. 14 is a block diagram of a LAN with multiport enrouter and general server node with gateway to high performance network.
Figure 15:
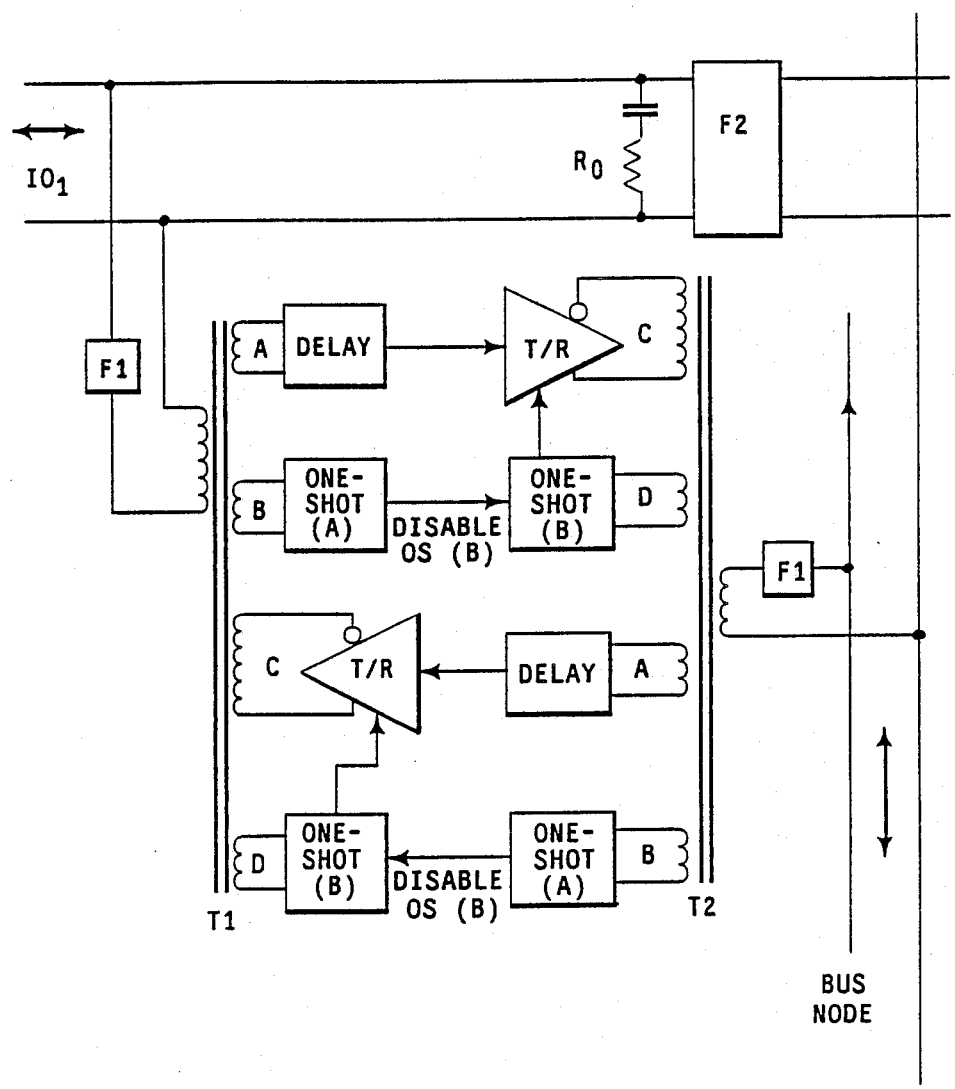
FIG. 15 is an example of a half-duplex/half duplex bidirectional driver.
Figure 16:
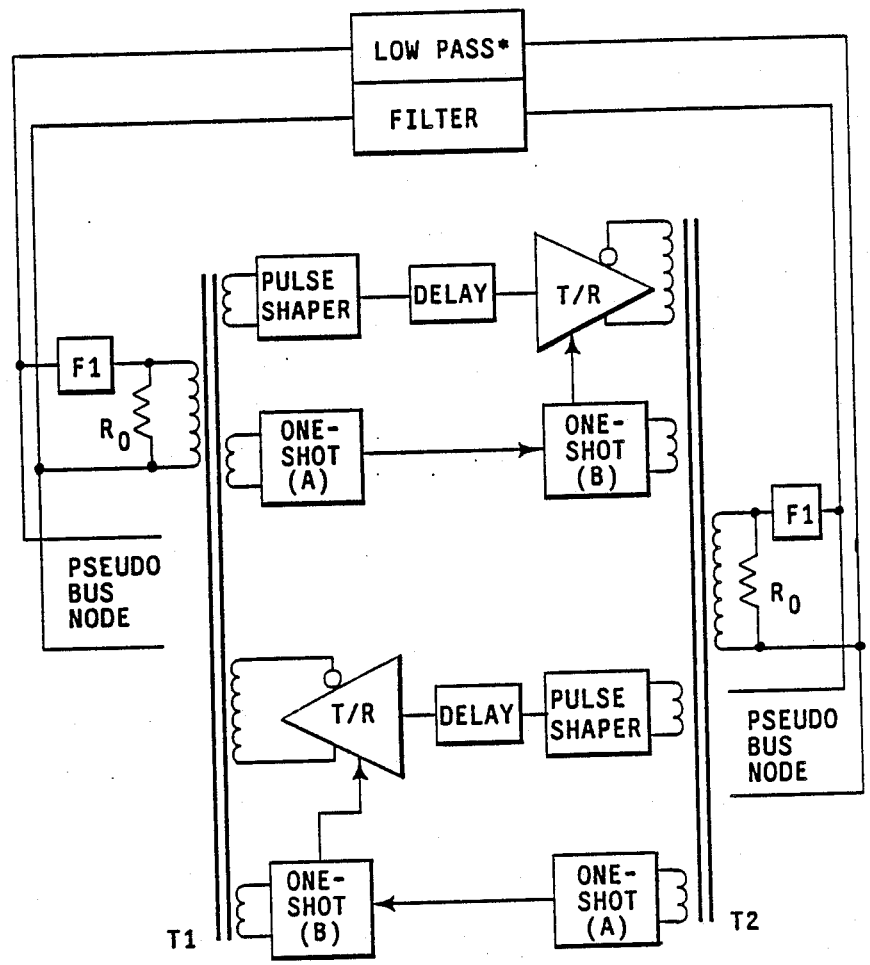
FIG. 16 is an example of a pulse regenerator unit (PRU) for a half-duplex RU pseudo bus node expansion.

FIGS. 14 and 15 illustrate the bidirectional driver application to the I/O port portion of the RU. When a two wire half-duplex pseudo bus node implementation is used, any pulse regenerator units (PRUs) required for pseudo bus node expansion must be bidirectional and could use the same techniques described for the half-suplex I/O connections. FIG. 16 illustrates a bidirectional PRU implementation for a half-duplex bus node expansion. The major difference from the circuits of FIGS. 14 and 15 is the addition of pulse shapes to regenerate the signals to eliminate electrical degradation of the signal. The low pass filter shown in parallel with the bidirectional driver is only needed if the wires are being used for a voice connection.

The interconnect flexibility of the disclosed technique provides a good opportunity to use a cluster controller 70 if advantageous without incurring the interconnectability disadvantages. In this technique, the cluster controller 70 is placed in the distribution closet and accepts the communication lines from the clustered workstations (see FIG. 7). The cluster controller connects into the RU and the entire cluster is connected into the network with one controller.

Intelligent routers, FIG. 14, provide another means of enhancing the performance and versatility of the low cost network. Previously, it was mentioned that relative to electrical considerations, there are no practical limitations on the size of a network using this technique. However, depending on the application environment, performance considerations could become a limiting factor in determining how large the network will be allowed to get in terms of number of users. Intelligent routers, by providing address filtering, can allow the creation of very large networks without the associated degradation.

It is important that a low cost networking option allow easy linking to a higher performance LAN (Local Area Network) such as the Ethernet network via an appropriate gateway. Functionally, the gateway would have two interface ports, one each to the high and low performance LANs. The gateway must provide any protocol conversions needed and, specifically, it would need to reinstitute the collision detection feature if the disclosed technique is implemented as a CSMA (two wire) approach.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A local area network for communicating between two or more nodes, each node comprising a telephone for generating and receiving voice signals and a workstation for generating and receiving digital signals, said network comprising:
   telephone switching means for switching voice signals and
   data bus means for communicating digital signals, and wherein each node further comprises:
   wire means
   first means for coupling voice signals, but not digital signals, between said telephone and said wire means,
   second means for coupling digital signals, but not voice signals, between said workstation and said wire means,
   third means for coupling voice signals, but not digital signals, between said switching means and said wire means, and
   fourth means for coupling data signals, but not voice signals, between said data bus means and said wire means,
   said data signal communications and said voice signal communications being capable of operation simultaneously and without interference.

2. The Network of claim 1 wherein said wire means comprises telephone wire.

3. The network of claim 2 wherein said data bus means comprises telephone wire.

4. The network of claim 1 wherein said first and third means are low pass filters and said second and fourth means are high pass filters.

5. The network of claim 1 wherein said first and third means comprise terminating impedances for said digital signals.

6. A local area network for communicating between two or more nodes, each node comprising a telephone for generating and receiving voice signals and a workstation for generating and receiving digital signals, said network comprising:
   telephone switching means for switching voice signals and
   data bus means for communicating digital signals, and wherein each node further comprises:
   a pair of telephone wires,
   four means for coupling voice signals, but not digital signals, each connected to the ends of said two telephone wires, two of said means for coupling voice signals connected to said telephone, the other two of said means for coupling voice signals connected to said telephone switching means, and
   two means for coupling digital signals, but not voice signals, one for coupling said workstation to said pair of telephone lines, the other for coupling said data bus to said pair of telephone lines.

7. The network of claim 6 wherein said data bus means comprises a pair of telephone wires.

8. The network of claim 6 wherein said means for coupling voice signals are low pass filters and said means for coupling digital signals are high pass filters.

9. The network of claim 6 wherein said means for coupling voice signals comprise terminating impedances for said digital signals.

10. A local area network for communicating between two or more nodes, each node comprising a telephone for generating and receiving voice signals and a workstation for generating and receiving digital signals, said network comprising:
   telephone switching means for switching voice signals and
   data bus means for communicating digital signals, and wherein each node further comprises:
   two pairs of telephone wires,
   four means for coupling digital signals, but not voice signals, the first for coupling digital signals from said workstation to the first pair of telephone wires, the second for coupling digital signals from said first pair of telephone wires to said data bus means, the third for coupling digital signals from the data bus means to the second pair of telephone wires and the fourth for coupling digital signals from said second pair of telephone wires to said workstation,
   first means for coupling voice signals, but not digital signals, from one of the two said pairs of telephone wires to said telephone switching means, and second means for coupling voice signals, but not digital signals, from said one pair of telephone wires to said telephone.

11. The network of claim 10 wherein said data bus means comprises a pair of telephone wires.

12. The network of claim 10 wherein said means for coupling voice signals are low pass filters and said means for coupling digital signals are high pass filters.

13. The network of claim 10 wherein said means for coupling voice signals comprise terminating impedances for said digital signals.

14. A local area network for generalized data signal communications between two or more workstations in a campus or short distance environment, the improvement comprising:
  communication network means for linking said workstation, said communication network means comprising the existing telephone wiring in said campus or short distance environment,
  telephone equipment means also conducting normal voice communication over said communication network means,
  node unit circuit means providing coupling between individual workstations and the immediate local telephone link coupling said individual workstations to a local distribution junction or telephone closet in said campus or short distance environment, said node unit circuit means providing a first communication interface between a workstation and said local telephone link,
  repeater unit circuit means at said local distribution junction or telephone closet for coupling data signals between telephone links to individual workstations, said repeater unit circuit means providing a second communication interface between various workstations coupled thereto, and
  said node unit circuit means and said repeater unit circuit means also providing a path for normal telephone voice communications,
  wherein said second communication interface in said repeater unit circuit means between various workstations comprises a bus node means for connection to other telephone links to other workstations associated with said repeater unit circuit means and other, separate, workstations associated with other, separate, repeater unit circuit means,
  wherein said local telephone link comprises a two-wire cable for operation in half-duplex mode wherein signals from said node unit circuit means to said repeater unit circuit means and signals to said node unit circuit means from said repeater unit circuit means travel on said two-wire cable at separate, distinct, times,
  wherein said bus node means comprises a four-wire bus and further including,
  bilateral amplifier means coupled to said pair of wires carrying signals from said node unit circuit means to said repeater unit circuit means and from said repeater unit circuit means to said node unit circuit means, said amplifier means amplifying that signal from and to said node unit circuit means and said repeater unit circuit means depending upon which signal reached said bilateral amplifier means first, said network operating in half duplex-simplex mode.

15. A local area network for generalized data signal communications between two or more workstations in a campus or short distance environment, the improvement comprising:
  communication network means for linking said workstations, said communication network means comprising the existing telephone wiring in said campus or short distance environment,
  telephone equipment means also conducting normal voice communication over said communication network means,
  node unit circuit means providing coupling between individual workstations and the immediate local telephone link coupling said individual workstations to a local distribution junction or telephone closet in said campus or short distance environment, said node unit circuit means providing a first communication interface between a workstation and said local telephone link,
  repeater unit circuit means at said local distribution junction or telephone closet for coupling data signals between telephone links to individual workstations, said repeater unit circuit means providing a second communication interface between various workstations coupled thereto, and
  said node unit circuit means and said repeater unit circuit means also providing a path for normal telephone voice communications,
  wherein said second communication interface in said repeater unit circuit means between various workstations comprises a bus node means for connection to other telephone links to other workstations associated with said repeater unit circuit means and other, separate, workstations associated with other, separate, repeater unit circuit means,
  wherein said local telephone link comprises a two-wire cable for operation in half-duplex mode wherein signals from said node unit circuit means to said repeater unit circuit means and signals to said node unit circuit means from repeater unit circuit means travel on said two-wire cable at separate distinct, times,
  wherein said local telephone bus node comprises a two wire bus,
  bilateral amplifier means coupled to said pair of wires carrying signals from said node unit circuit means to said repeater unit circuit means and from said repeater unit circuit means to said node unit circuit means, said amplifier means amplifying that signal from and to said node unit circuit means and said repeater unit circuit means depending on which signal reached said bilateral amplifier means first, said network operating in a half-duplex-half-duplex mode.

* * * * *